2,771,332
Patented Nov. 20, 1956

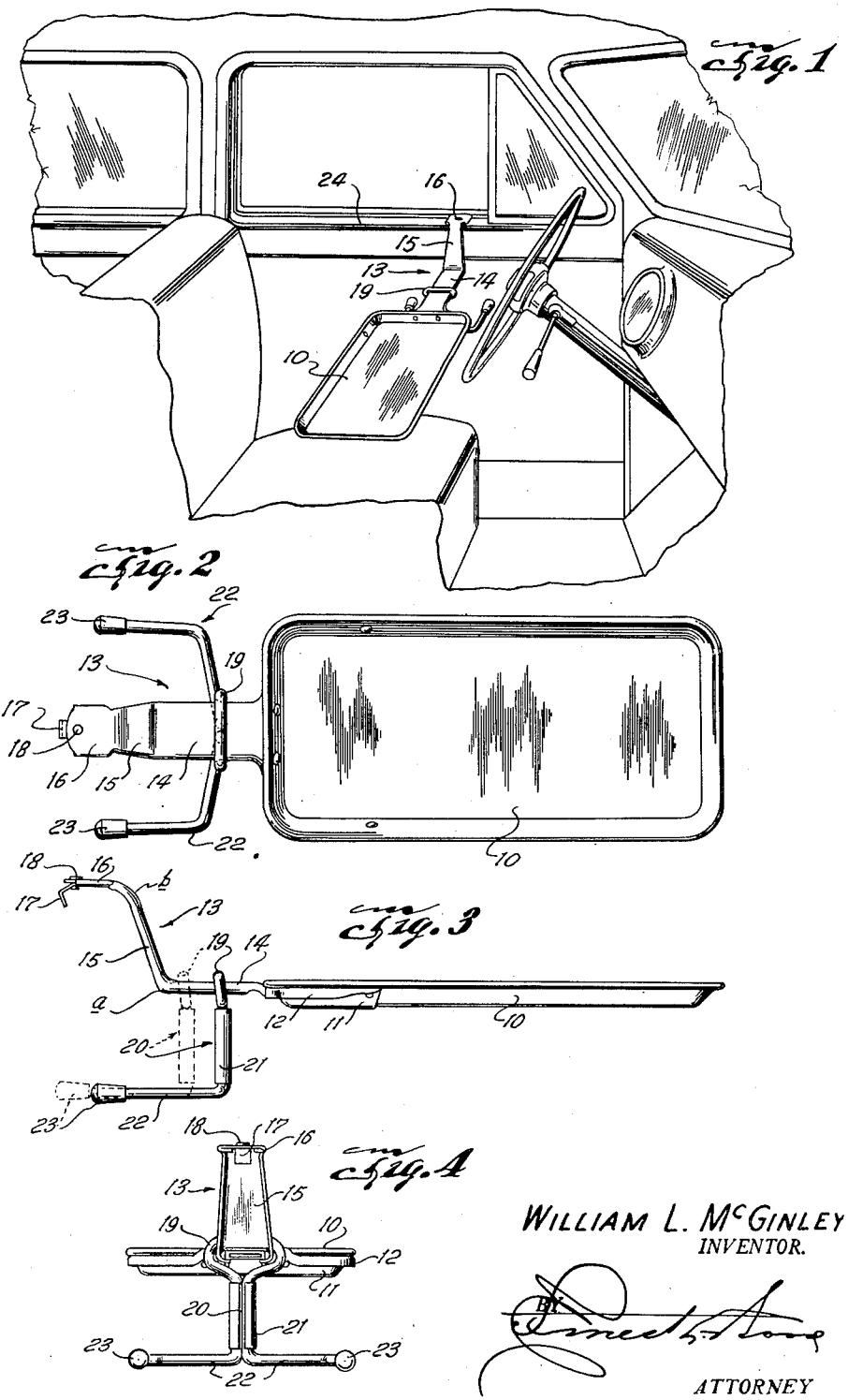

2,771,332
DETACHABLE SERVING TRAY FOR AUTOMOBILES

William L. McGinley, Dallas, Tex., assignor to American Permanent Wear Company, Dallas, Tex.

Application June 11, 1953, Serial No. 360,994

6 Claims. (Cl. 311—21)

This invention relates to automobile serving trays and more particularly to certain new and useful improvements in adjustable mountings for such trays.

The principal object of the invention is to provide an automobile serving tray which, by virtue of certain novel instrumentalities, may be firmly positioned within an automobile behind the steering wheel as a convenience to the vehicle operator by employing as a support the window ledge or sill and that portion of the automobile door immediately below the window. Provision is made in the tray mounting for accommodating the same to variations in interior automotive design to maintain the tray on a horizontal plane.

Another object of the invention resides in its simplicity of design and structure and ease of adjustment without sacrificing durability and stability when in position as well as in the important features which permit the trays to be stacked one upon the other resulting in the conservation of space in storing and shipping.

Other objects will appear as the description proceeds, taken with the annexed drawing, wherein:

Figure 1 is a fragmentary view of the interior of an automobile, showing the invention installed therein.

Figure 2 is a top plan view of the tray and mounting per se.

Figure 3 is a side elevational view thereof, and

Figure 4 is a rear end elevational view.

Continuing with a more detailed description of the drawing, reference numeral 10 denotes a serving tray which may obviously be of any desired shape but in view of the conventional practice among attendants of drive-in eating and refreshment establishments to serve all automobile occupants from the driver's window, it is considered a practical expedient to produce the tray in such dimension that it may be conveniently situated between the driver and the steering wheel of the automobile, from which vantage point the driver may serve other occupants of the automobile. Moreover, the object in designing the mounting for supporting the tray within the automobile is to enable motorists to be comfortably served in inclement weather.

Riveted or otherwise attached to one end of the tray 10 is a supporting plate 11 which is shaped to conform to that portion of the bottom of the tray nearest the mounting end to serve as a reinforcing medium and the edges of the supporting plate are formed into a flange 12 of a contour corresponding to that of the end of the tray.

The material of which the supporting plate 11 is formed is reduced in width at the end of the tray to define a narrow extension 13 which is reinforced by folding the edges of the extension on the underside of the latter. The extension 13 is formed with opposite bends a and b, creating a goose-neck composed of an elongated horizontal portion 14 parallel with the plane of the tray 10, an angularly upstanding portion 15 and a shorter horizontal portion 16.

Attached to the extremity of the short horizontal portion 16 of the extension or goose-neck 13 is a hook-like element 17. This element is loosely joined to the goose-neck by means of a pivot pin 18 so that it may swivel or oscillate to accommodate the tray 10 to variations in automotive window and door design, the hook 17 being adapted for insertion in the glass channel of an automobile door between the glass and the inner sill of the window, as revealed in Figure 1.

To support the tray 10 in a horizontal position, a bracing member is provided which consists of a rod of predetermined length, bent at its midsection to form a flat loop 19 which loosely encircles the goose-neck 13. The portions of the rod below the loop 19 are brought into parallelism to form a leg 20, the loop being disposed at a slight angle in relation to the longitudinal axis of the leg. A sleeve 21 is formed around the leg to hold the parallel portions thereof firmly together and the rod forming the loop 19 and the leg 20 has its ends turned outwardly into two oppositely extending branches 22, each of which is bent to extend rearwardly of the tray. Rubber tips 23 are applied to the extremities of the branches 22 and serve as abutments for the support, bearing against the inner surface of the automobile door immediately below the sill 24 behind which the hook 17 is engaged.

To mount the tray on an automobile door, the hook 17 is first inserted between the glass of the door and the sill 24. The leg 20 is grasped and moved along the horizontal portion 14 of the goose-neck 13 until the abutments 23 are brought up against the door under the window, with the tray in horizontal position. The upper surface of the horizontal portion 14 is engaged by the inner surface of the top of the loop 19 while the bottom surface of the horizontal portion 14 engages the inner surface of the bottom portion of the loop. The weight of the tray 10 and that of its contents exerts a force on the loop at the points described, through the goose-neck portion 14 which tends to increase friction between the loop and portion 14 in proportion to weight, thus preventing displacement of the tray in relation to its support.

It is evident from the foregoing that while the tray and mounting have been described as an inside serving tray, it can be mounted with equal facility out the outside of an automobile or on any surface of like nature.

Manifestly, the construction as shown and described is capable of some modification and such modification as may be construed to fall within the scope and meaning of the appended claims is also considered to be within the spirit and intent of the invention.

What is claimed is:

1. In an automobile service tray, a mounting for supporting said tray in relation to a window of said automobile, comprising a single goose-neck having a first horizontal portion affixed to and extending from one end of said tray, an upwardly and outwardly extending angular portion terminating in a second horizontal portion, a hook pivotally connected to the end of said second horizontal portion and engageable in the glass channel of a window of said automobile, a bracing member comprising a flattened loop slidably embracing said first horizontal portion of said goose-neck and having a depending portion carrying spaced apart legs at right angles to said depending portion whose ends are in abutting relationship with said automobile below said window when said tray is in operative position, said loop being disposed at an angle to said depending portion to frictionally engage the upper and lower surfaces of said first horizontal portion of said goose-neck to preclude horizontal sliding displacement of said loop in tray supporting position of said bracing member.

2. In an automobile service tray, a mounting therefor comprising a single goose-neck rigidly attached at one end to an end of said tray and whose opposite end is disposed above the horizontal plane of said tray, means attached to said opposite end of said goose-neck for connecting the same to the lower edge of an automobile window for limited oscillative movement of said tray in said horizontal plane, a bracing member having a loop slidably embracing said goose-neck and a pair of spaced apart leg members operatively connected to said loop and disposed below and operatively parallel to said horizontal plane of said tray, to bear against said automobile below said window, said loop being disposed at an angle to said horizontal plane of said tray in operative position of said leg members to frictionally engage top and bottom surfaces of said goose-neck to resist relative movement of said tray and bracing member.

3. An automobile service tray mounting comprising a tray, a single goose-neck rigidly connected at one end to an end of said tray and extending outwardly and upwardly above said tray, said goose-neck having an elongate portion thereof in the same horizontal plane with said tray, means pivotally carried by the opposite end of said goose-neck for engaging a supporting object, a bracing member having abutment means engaging said supporting object below the point of engagement therewith of said pivoted means, and means rigid with said bracing member loosely mounted for sliding displacement on the elongate portion of said goose-neck but effective in operative position of said tray and bracing member to grippingly engage said elongate portion of said goose-neck and support said tray on a horizontal plane through said bracing member.

4. In an automobile service tray, a suspension means for supporting said service tray below the lower edge of an automobile window within the latter, said suspension means comprising a single elongate bracket having one end rigidly secured to an end of said tray; means on the opposite end of said bracket for engaging the edge of the automobile window, said bracket having a pair of substantially parallel vertically spaced oppositely extending end portions and an intermediate portion extending angularly with respect to said tray and said end portions and a bracing member having a loop portion loosely movable on said bracket, and a pair of ends disposed below and outwardly of said loop for engaging said automobile below said window, said loop having opposite portions engageable with opposite sides of the end portion of said bracket nearest said tray when said loop is pivoted about an axis substantially perpendicular to the axis of said intermediate portion to lock said bracing member immovably to said bracket whereby said tray may be rigidly supported on said automobile.

5. In a serving tray for an automobile, a suspension means for supporting said tray below the lower edge of an automobile window, said suspension means comprising a single goose-neck having a first horizontal portion affixed to and extending from one end of said tray, an upwardly and outwardly extending angular portion terminating in a second horizontal portion, a hook pivotally connected to the end of said second horizontal portion and engageable with the sill of a window of said automobile, a bracing member having abutment means engaging said automobile below said sill, and means integral with said bracing member and loosely mounted for sliding displacement on the first horizontal portion of said goose-neck but effective in operative position of said tray and bracing member to grippingly engage said first horizontal portion of said goose-neck to support said tray on a horizontal plane.

6. A serving tray and a mounting comprising a single rigid extension at the rear end of said tray having a first elongate horizontal portion, an angular upstanding portion and a second horizontal portion, a hook pivoted to the end of said second horizontal portion, a support for said tray having a loop loosely embracing said first horizontal portion and provided with a depending leg having outwardly and rearwardly extending branches, said loop frictionally engaging said first horizontal portion when said leg is substantially perpendicular to said first horizontal portion.

References Cited in the file of this patent

UNITED STATES PATENTS

| | | |
|---|---|---|
| 1,833,829 | Doolin | Nov. 24, 1931 |
| 1,850,599 | Milner | Mar. 22, 1932 |
| 1,891,180 | Ravlin | Dec. 13, 1932 |
| 1,899,480 | Ravlin | Feb. 28, 1933 |
| 1,921,463 | Graham | Aug. 8, 1933 |
| 1,956,060 | De Foe et al. | Apr. 24, 1934 |
| 2,002,328 | Mitchell | May 21, 1935 |
| 2,049,386 | Temperli | July 28, 1936 |
| 2,388,192 | Stechbart | Oct. 30, 1945 |
| 2,593,222 | Tracy | Apr. 15, 1952 |
| 2,645,537 | Brath et al. | July 14, 1953 |